UNITED STATES PATENT OFFICE.

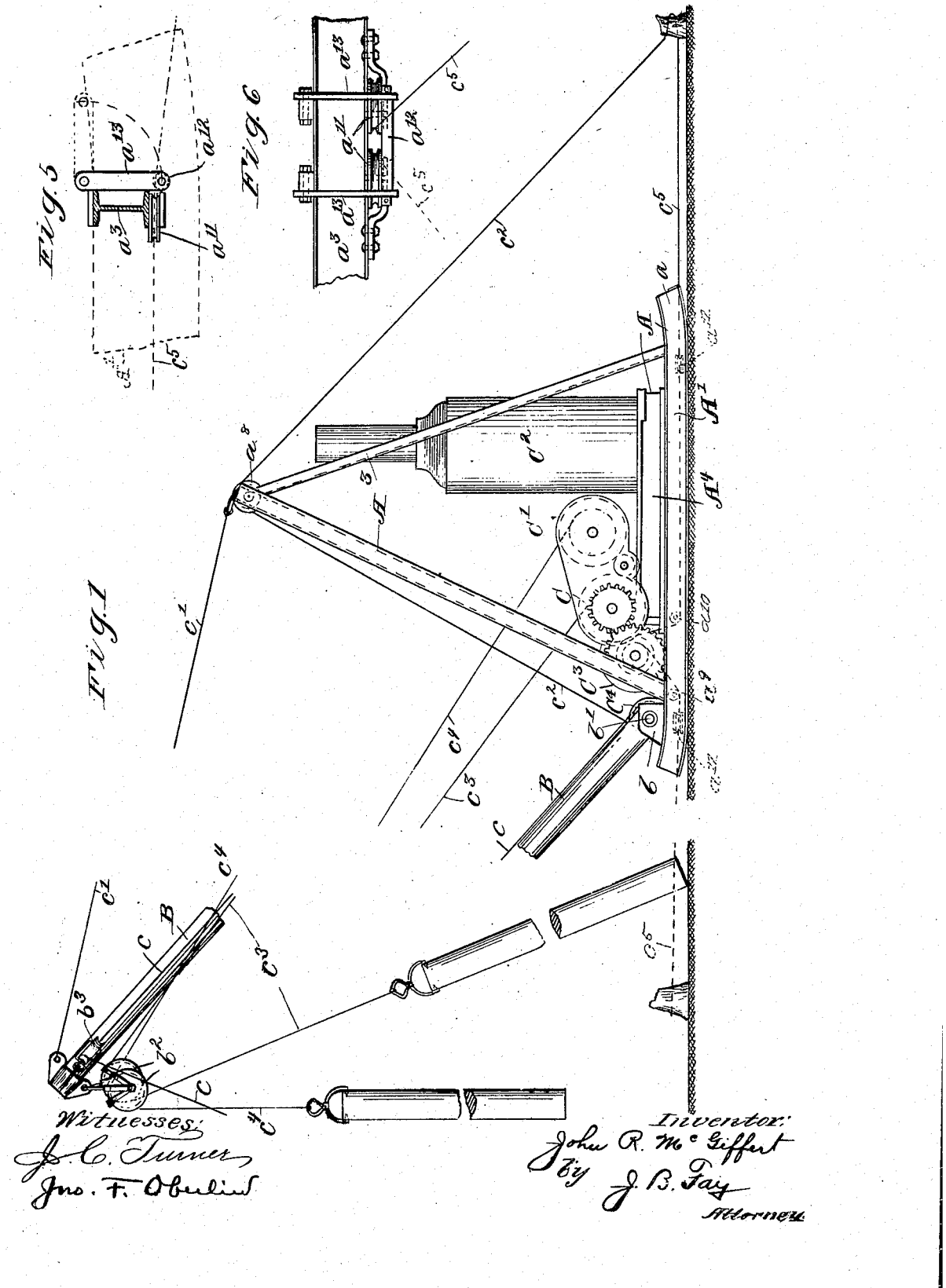

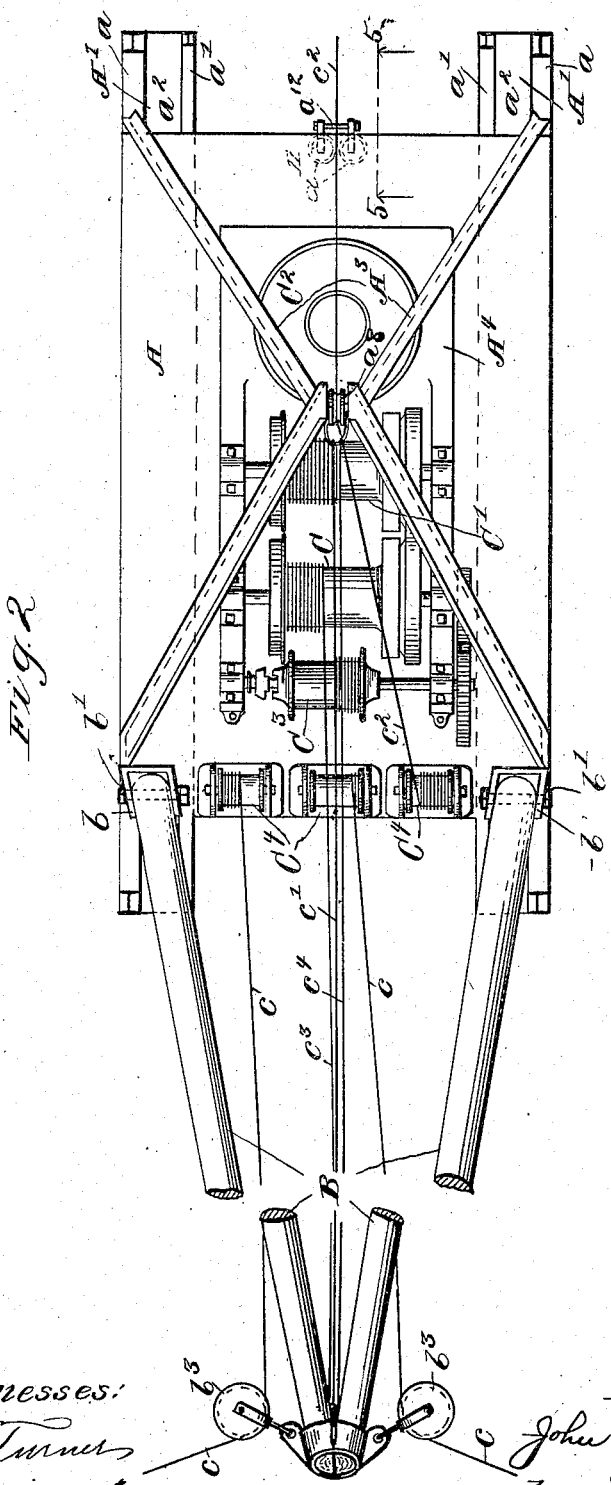

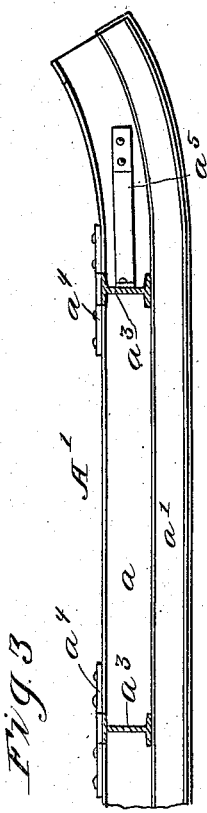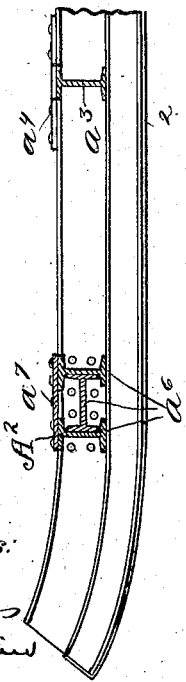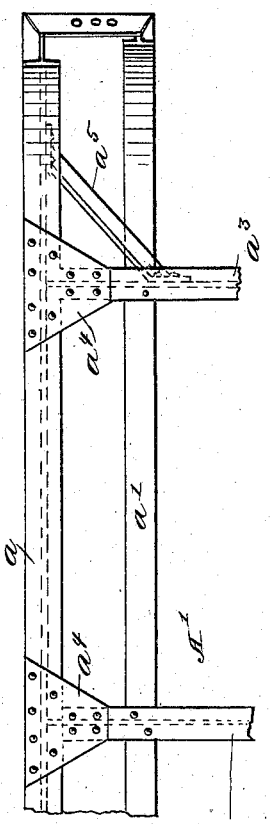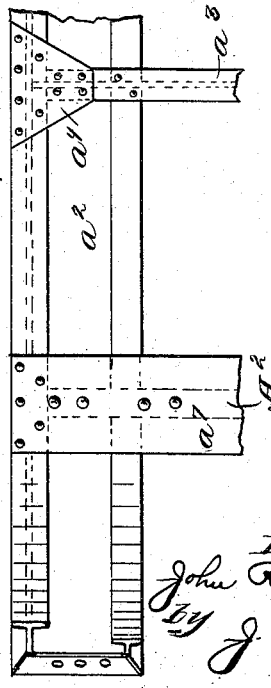

JOHN R. McGIFFERT, OF DULUTH, MINNESOTA, ASSIGNOR TO CLYDE IRON WORKS, OF DULUTH, MINNESOTA, A CORPORATION OF MINNESOTA.

LOG-SKIDDING MACHINE.

936,653.     Specification of Letters Patent.     Patented Oct. 12, 1909.

Application filed February 5, 1909. Serial No. 476,230.

*To all whom it may concern:*

Be it known that I, JOHN R. McGIFFERT, a citizen of the United States, and a resident of Duluth, county of St. Louis, and State of Minnesota, have invented a new and useful Improvement in Log-Skidding Machines, of which the following is a specification, the principle of the invention being herein explained and the best mode in which I have contemplated applying that principle, so as to distinguish it from other inventions.

The present invention while specifically termed a log-skidding machine, is adaptable in certain of its features at least, for general use in connection with logging operations in the forest, whether for skidding or loading. In its general construction, in other words, the present machine resembles the machines shown in Patents Nos. 833,748, and 833,794, issued to me October 23, 1906. The machines there shown, however, aside from being designed primarily for loading logs onto cars, were furthermore designed to rest upon the cars, being slid thereover by means of a spotting cable operated by one of the engine drums. The present machine, on the other hand is adapted to be run over the ground, and is so constructed as to render it capable of such use, irrespective of the character of the ground, so that it may be used in soft and swampy places, if found desirable. In addition to the foregoing, said machine presents other features of construction and operation constituting the present invention, all of which will be hereinafter fully described, and particularly pointed out in claims.

The annexed drawings and the following description set forth in detail certain mechanism embodying the invention, such disclosed means constituting, however, but one of various mechanical forms in which the principle of the invention may be used.

In said annexed drawings:—Figure 1 is a side elevational view of my improved skidding machine; Fig. 2 is a plan of the same; Fig. 3 is a longitudinal sectional view of the slidable base that forms one of the features of the machine; Fig. 4 is a broken plan view of such base; Fig. 5 is a transverse sectional view of a detail of the machine; and Fig. 6 is an end elevational view of the same detail.

The slidable base A of the machine rests upon runners A' formed out of pairs of spaced, longitudinally extending beams $a$ $a'$. Of these beams the two outermost $a$ are higher than the two intermediate beams $a'$, and plates $a^2$ are secured to the under sides of the members of each pair, thus seen to consist of one high and one low beam, which plates provide the necessary broad bearing surface to support the machine when operating over low and swampy ground, see Figs. 3 and 4. At the same time such broader bearing surface is desirable even on solid ground, as it increases the stability of the machine.

Running transversely of the machine, are cross beams $a^3$, which rest on the intermediate longitudinal beams $a'$, and are terminally secured to the outermost of said longitudinal beams, the tops of said transverse beams being flush with the tops of the latter. Such cross beams $a^3$ are thus secured to the outermost or side beams by means of plates $a^4$ riveted to the flanges of the cross-beams and of the side beams, while angle connections or braces $a^5$ may be used to further secure the webs of the beams together, if desired. At the front of the machine, instead of a simple transverse beam as $a^3$, a heavy cross girder $A^2$ built of three beams $a^6$ and a plate $a^7$ is employed. Such girder supports the boom B of the machine, and also serves as a base for the guying drums, as will now be set forth.

The ends of the legs of the boom, which is of A-form, are stepped into sockets $b$, Figs. 1 and 2 where they are pivotally retained by pins $b'$ in the usual fashion, while from the peak of said boom are hung the skidding blocks $b^2$, and also other blocks $b^3$ (shown in Fig. 2 only) through which pass the guy lines $c$, the outer ends of the latter being attached to trees or other suitable fixed objects at either side of the machine, in order to prevent the latter from tilting when skidding in logs.

Substantially central with respect to the machine base, is mounted an angular four-legged frame $A^3$, to the apex of which is attached the holding cable $c'$ for the boom. In such apex or peak of the frame is furthermore supported a sheave $a^8$ over which may be run a third guy line $c^2$ in case it is desired to guy the machine from the rear. It is not contemplated that this third guy line will be regularly used, since it will only be necessary where the length of the base is such as to endanger its tilting forward when the strain is thrown on the skidding lines $c^3$ $c^4$. For working such skidding lines, two drums C C' are provided in connection with the engine $C^2$, the latter resting upon a deck $A^4$ built upon the transverse beams $a^3$ of the base, and the drums being located immediately in front of the same. In addition to such drums C C' for the skidding lines, I provide a third drum $C^3$ for moving, or spotting, the machine. The spotting cable $c^5$ from such third drum is adapted (see Fig. 1) to be carried either forwardly or to the rear, by being passed under one or the other of rollers $a^9$, $a^{10}$ in the machine base, and then passed through between guide sheaves $a^{11}$ secured on the under side of the rearmost transverse beam $a^3$ of said base, or on the under side of the front girder $A^2$, as the case may be. The disposition and construction of the guide sheaves $a^{11}$ is more fully shown in Figs. 5 and 6, from which it will be seen that in order to prevent the cable from dropping out from between the sheaves, a small roller $a^{12}$ journaled at its ends in hangers $a^{13}$ is employed. Such hangers are pivotally supported from the beam $a^3$, so that the roller carried thereby may be swung upwardly into the position shown in dotted outline in Fig. 5. When in this position, ample space is afforded, through which to pass or drop the rings and hook on the end of the spotting cable $c^5$, but when in its lower, normal position, said roller obviously supports the cable at all times in strict alinement with the two guide sheaves.

The operation of my improved skidding machine, will, it is thought, be fully evident from the foregoing description of the construction and the mode of operation of its several elements. To move the machine from one point to another, the spotting cable $c^5$ is drawn out through the corresponding end of the base, and attached to a stump, tree or other fixed object; then by winding in said cable, the machine will be drawn in a corresponding direction. This will ordinarily be backwardly for obvious reasons. In order to set up the machine for operation, once the desired location has been reached, the guy lines $c$ over the end of the boom are run out, their free ends similarly secured, and then the lines drawn taut, by winding the corresponding guying drums $C^4$. Where the third guying drum and line are used, such line will likewise be run out, secured, and drawn taut. The skidding lines $c^3$ $c^4$, or hoisting lines, as I shall term them, generically, inasmuch as they are capable of functioning in either way, may then be run out, preferably in opposite directions or sides of the machine, so that the strain of pulling in the logs may be more or less balanced upon the boom.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the class described, a slidable base comprising spaced pairs of longitudinal beams and plates secured to the undersides of such pairs of beams, respectively, thereby forming runners, substantially as described.

2. In a machine of the class described, a slidable base comprising spaced longitudinal beams, the two outermost of said beams being higher than the intermediate beams, transverse beams resting on the latter, and plates secured to the undersides of said beams to form runners, substantially as described.

3. In a machine of the class described, a slidable base comprising spaced pairs of longitudinal beams, the two outermost of said beams being higher than the intermediate beams, transverse beams resting on the latter, and plates secured to the undersides of such pairs of longitudinal beams, respectively, thereby forming runners, substantially as described.

4. In a machine of the class described, a slidable base comprising spaced pairs of longitudinal beams, the two outermost of said beams being higher than the intermediate beams, transverse beams resting on said intermediate beams and terminally attached to said outermost beams, and plates secured to the undersides of such pairs of longitudinal beams, respectively, thereby forming runners, substantially as described.

5. In a machine of the class described, a slidable base comprising spaced pairs of longitudinal beams, the two outermost of said beams being higher than the intermediate beams, transverse beams, including a girder, resting on said intermediate, and terminally attached to said outermost, longitudinal beams, and plates secured to the undersides of such pairs of longitudinal beams, respectively, thereby forming runners, substantially as described.

6. In a machine of the class described, a slidable base comprising spaced pairs of longitudinal beams, the two outermost of said beams being higher than the intermediate beams, transverse beams, including a girder, resting on said intermediate, and terminally attached to said outermost, longitudinal beams, said girder being located near one end of said longitudinal beams, and plates secured to the undersides of such pairs of longitudinal beams, respectively, thereby forming runners, substantially as described.

7. In a machine of the class described, the combination of a slidable base, a frame rising above the same, a boom mounted upon one end of said base, a holding cable from said boom to said frame, a hoisting drum provided with a cable passing over said boom, guying means for said boom, and spotting means for said base.

8. In a machine of the class described, the combination of a slidable base, a frame rising above the same, a boom mounted upon one end of said base, a holding cable from said boom to said frame, a hoisting drum provided with a cable passing over said boom, two guying drums provided with cables likewise passing over said boom, and spotting means for said base.

9. In a machine of the class described, the combination of a slidable base, a frame rising above the same, a boom mounted upon one end of said base, a holding cable from said boom to said frame, a hoisting drum provided with a cable passing over said boom, two guying drums provided with cables likewise passing over said boom, a third guying drum having a cable passing over said frame, and spotting means for said base.

10. In a machine of the class described, the combination of a slidable base, a frame rising above the same, a boom mounted upon one end of said base, a holding cable from said boom to said frame, a hoisting drum provided with a cable passing over said boom, two guying drums provided with cables likewise passing over said boom, a third guying drum having a cable passing over said frame, a spotting drum provided with a cable, and guide-means adapted to receive said spotting cable when extended in either direction.

11. In a machine of the class described, the combination with a slidable base comprising spaced pairs of longitudinal beams and plates secured to the undersides of such pairs of beams, respectively, thereby forming runners; of a boom mounted on said base; a hoisting drum provided with a cable passing over said boom; guying means for said boom; and spotting means for said base.

12. In a machine of the class described, the combination with a slidable base comprising spaced pairs of longitudinal beams, the two outermost of said beams being higher than the intermediate beams, transverse beams, including a girder, resting on said intermediate, and terminally attached to said outermost, longitudinal beams, and plates secured to the undersides of such pairs of longitudinal beams, respectively, thereby forming runners; of a boom mounted upon said girder; a deck supported upon said other transverse beams; and hoisting mechanism mounted on said deck.

13. In a machine of the class described, the combination with a slidable base comprising spaced pairs of longitudinal beams, the two outermost of said beams being higher than the intermediate beams, transverse beams, including a girder, resting on said intermediate, and terminally attached to said outermost, longitudinal beams, and plates secured to the undersides of such pairs of longitudinal beams, respectively, thereby forming runners; of a boom mounted upon said girder; a deck supported upon said other transverse beams; an angular frame rising above said deck; a holding cable from said boom to said frame; and hoisting mechanism mounted on said deck.

14. In a machine of the class described, the combination with a slidable base comprising spaced pairs of longitudinal beams, the two outermost of said beams being higher than the intermediate beams, transverse beams, including a girder, resting on said intermediate, and terminally attached to said outermost, longitudinal beams, and plates secured to the undersides of such pairs of longitudinal beams, respectively, thereby forming runners; of a boom mounted upon said girder; a deck supported upon said other transverse beams; an angular frame rising above said deck; a holding cable from said boom to said frame; hoisting mechanism mounted on said deck; and drums mounted upon said girder between the legs of said boom and provided with guy lines passing over said boom.

15. In a machine of the class described, the combination with a slidable base comprising spaced pairs of longitudinal beams, the two outermost of said beams being higher than the intermediate beams, transverse beams, including a girder, resting on said intermediate, and terminally attached to said outermost, longitudinal beams, and plates secured to the undersides of such pairs of longitudinal beams, respectively, thereby forming runners; of a boom mounted upon said girder; a deck supported upon said other transverse beams; an angular frame rising above said deck; a holding cable from said boom to said frame; hoisting mechanism mounted on said deck; and drums mounted upon said girder between the legs of said boom and provided with three guy lines, two passing over said boom and the third over said frame.

16. In a machine of the class described, the combination of a movable base, a winding-drum and cable mounted on said base for moving the same, and cable-guiding means borne by said base, said means including two sheaves lying in substantially the same plane, and an elongated guide member transversely disposed with respect to said sheaves and movable away therefrom, substantially as described.

17. In a machine of the class described, the combination of a movable base, a winding-drum and cable mounted on said base for moving the same, and cable-guiding means borne by said base, said means including two sheaves lying in substantially the same horizontal plane, and a roller adapted to lie transversely of said sheaves, said roller being pivotally hung from an axis above said sheaves so as to be movable away therefrom, substantially as described.

18. Cable-guiding means comprising two sheaves lying in substantially the same plane, and an elongated guide member transversely disposed with respect to said sheaves and movable away therefrom, substantially as described.

19. Cable-guiding means comprising two sheaves lying in substantially the same horizontal plane, and a roller adapted to lie transversely of said sheaves, said roller being pivotally hung from an axis above said sheaves so as to be movable away therefrom, substantially as described.

Signed by me this 30th day of January, 1909.

JOHN R. McGIFFERT

Attested by—
J. J. LUMM,
EVELYN M. RYAN.